L. P. Teed,
Horse Power.
No. 109,967. Patented Dec. 6, 1870.
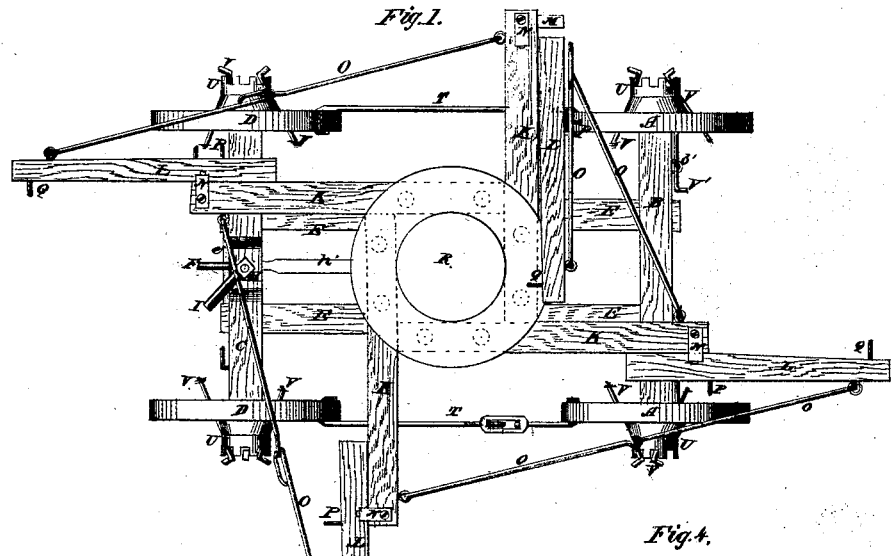
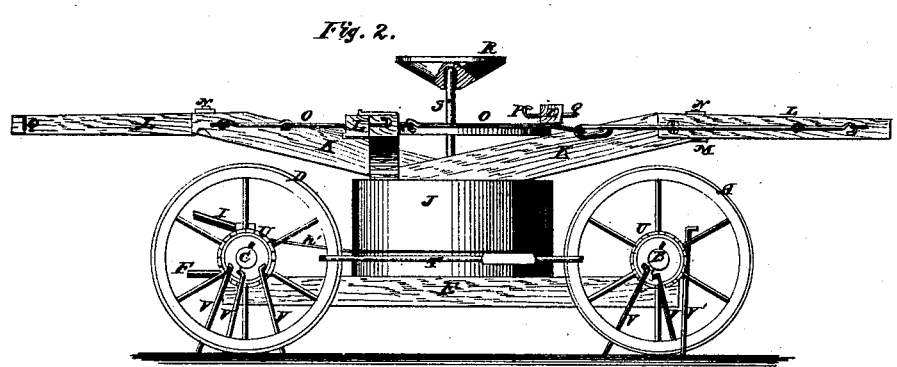
Witnesses:
P. C. Dietrich
L. S. Mabee
Inventor:
Lorenzo P. Teed
Per Munn & Co.
Attorneys.

United States Patent Office

LORENZO P. TEED, OF MECHANICSBURG, PENNSYLVANIA.

Letters Patent No. 109,967, dated December 6, 1870.

IMPROVEMENT IN HORSE-POWERS.

The Schedule referred to in these Letters Patent and making part of the same.

*To all whom it may concern:*

Be it known that I, LORENZO P. TEED, of Mechanicsburg, in the county of Cumberland and State of Pennsylvania, have invented a new and useful Improvement in Horse-Powers; and I do hereby declare that the following is a full, clear, and exact description thereof, which will enable others skilled in the art to make and use the same, reference being had to the accompanying drawing forming part of this specification.

Figure 1 is a top view of my improved power, one of the levers being turned back in position for traveling, and the others being extended in position for work.

Figure 2 is a side view of the same.

Figure 3 is a detail view of one of the stakes.

Figure 4 is a detail front view of the middle part of the forward axle and its connections.

Similar letters of reference indicate corresponding parts.

My invention has for its object to furnish an improved horse-power, which shall be so constructed and arranged that it may be firmly secured in place and securely held while at work, conveniently and quickly and without removing it from the wagon; and It consists in the construction and combination of various parts of the power, as hereinafter more fully described.

A are the rear wheels;

B is the rear axle;

C is the forward axle; and

D are the forward wheels.

E are the frame-timbers or sills of the power, the rear ends of which are securely bolted to and beneath the rear axle B.

The forward ends of the timbers or sills E are connected and held in their proper relative positions by a short cross-bar, e', which is notched upon its upper side for the passage of the tumbling-rod F, and has a staple, G, attached to it, which staple passes through an eye in the lower end of the king-bolt H, and straddles the tumbling-rod F.

The upper end of the king-bolt H has a screw-thread cut upon it to receive the lever-nut I.

By this construction, by tightening the nut I the frame E will be firmly held to the axle C for work, and by loosening the said nut the axle may have the necessary play for traveling from place to place.

The axle is held from rocking by the brace-rod or bar h', through the forward end of which the king-bolt H passes, and the rear end of which is secured to the frame-work of the machine.

J is the drum or wheel, to which the levers or sweeps are attached, and which is connected to the tumbling-rod by gearing in the ordinary manner.

The levers or sweeps are made in two parts, K L.

The inner ends of the inner parts K are securely bolted to the drum or wheel J, and their outer parts incline upward, so as to pass freely over the wheels A D.

The inner ends of the outer parts L overlap the outer ends of the inner parts K, as shown in fig. 1, and the said overlapped ends are pivoted to each other by a bolt, so that the said outer parts L may be turned over vertically to lie along the said inner parts K.

To the under side of the outer ends of the inner parts K are attached short arms or plates, M, to serve as supports to the outer parts L when turned down into a working position, in which position they are held by buttons or catches N, as shown in fig. 1.

The outer ends of the outer parts L may be inclined downward to bring the point of draft attachment to the proper elevation.

O are brace-rods, which are designed to support the outer parts L against the draft-strain.

The braces O are made in two parts.

The outer end of the outer part is pivoted to the rear side of the outer end of the outer part L, and the inner end of their inner parts is pivoted ts the forward side of the outer end of the inner part K.

In the inner end of the outer part of the brace-rods O is formed a slot or long eye, to receive an eye formed in the outer end of the inner parts of said braces O, thus forming a sliding joint to enable the outer part L of the levers or sweeps to be turned back without detaching the said braces from the said levers or sweeps.

P are hooks attached to the rear sides of the inner ends of the outer part L of the levers or sweeps, to receive and support the braces O when the said parts L are turned back along the inner parts K.

Q are the draft-hooks, which are attached to the forward side of the outer ends of the outer parts of the sweeps or levers.

R is the driver's seat, which is made with a hole or socket in its under side, to receive the upper end of the spindle S, about which the drum or wheel J revolves.

By this construction the driver can readily turn himself toward any desired part of the machine.

When the machine has been adjusted in place the two wheels on each side of the machine are connected by a rod, T, having a hook upon each end to hook upon the fellies of the wheels.

Upon one side of the machine the rod T may be made in one piece, but upon the other side it should be made in two pieces, connected to each other by a swiveled nut or by a long right-and-left nut, so that the wheels can be conveniently locked.

Upon the outer ends of the hubs of the wheels A

D are secured bands U, the outer edges of which are notched to receive and hold the iron stakes V.

These notches I prefer to make about an inch deep, an inch wide, and an inch apart, so that however the wheels may be adjusted some of these notches will always be in position to receive the stakes V.

The stakes V I prefer to make of inch square bar-iron, sharpened at their lower end upon three sides, leaving the fourth side straight.

When the machine has been adjusted in place the stakes V are passed through the wheels, between the spokes, with the straight side toward and close to the fellies, and with their upper end in one of the notches of the band U.

The stakes are then driven into the ground, and the peculiar shape of their points causes them to hug the fellies and forces their upper ends closely into the notches of the band U.

In ordinary circumstances one stake to a wheel will be sufficient, but more than one stake may be used for each wheel, if desired, or when the ground may be soft.

When the ground is very soft the long stakes V' may be passed through staples b', attached to the rear axle, through the wheels A, and driven into the ground.

The wheels A D should be sunk into the ground slightly, to bring the tumbling-rod F to the proper height for the horses to step over it.

Having thus described my invention,

I claim as new and desire to secure by Letters Patent—

1. The levers or sweeps K L, and brace-rods O, constructed and arranged in connection with each other and with the wheel or drum to which they are attached, substantially as herein shown and described and for the purpose set forth.

2. The hooked bars T, in combination with notched bands U, attached to the outer ends of the hubs of the wheels A D, and the staples b' attached to the rear axle B to receive and hold the stakes V V', substantially as herein shown and described.

3. The frame E that sustains the power with the axles B C, in combination with the staple G, king-bolt H, and lever-nut I, with the forward axle O and the frame E, substantially as herein shown and described, and for the purpose set forth.

4. The rotary seat R, in combination with the spindle S, about which the levers or sweeps K L revolve, substantially as herein shown and described, and for the purpose set forth.

LORENZO P. TEED.

Witnesses:
CHARLES TEED,
JOHN SLUTZ.